United States Patent
Westberg et al.

(10) Patent No.: US 12,146,485 B2
(45) Date of Patent: Nov. 19, 2024

(54) SYSTEM FOR SUBSEA PRESSURE BOOSTER POWER SUPPLY AND DISTRIBUTION, METHOD FOR OPERATION AND USE THEREOF

(71) Applicant: FSubsea AS, Oslo (NO)

(72) Inventors: Tommy Westberg, Torsby (SE); Torbjørn Strømsvik, Nesbru (NO)

(73) Assignee: FSubsea AS, Oslo (NO)

(*) Notice: Subject to any disclaimer, the term of this patent is extended or adjusted under 35 U.S.C. 154(b) by 246 days.

(21) Appl. No.: 17/620,048

(22) PCT Filed: Jun. 25, 2020

(86) PCT No.: PCT/NO2020/050181
§ 371 (c)(1),
(2) Date: Dec. 16, 2021

(87) PCT Pub. No.: WO2020/263105
PCT Pub. Date: Dec. 30, 2020

(65) Prior Publication Data
US 2022/0307489 A1    Sep. 29, 2022

(30) Foreign Application Priority Data
Jun. 26, 2019 (NO) .................................. 20190801

(51) Int. Cl.
*E21B 43/01* (2006.01)
*F04B 17/03* (2006.01)
(Continued)

(52) U.S. Cl.
CPC .............. *F04B 49/06* (2013.01); *E21B 43/01* (2013.01); *F04B 17/03* (2013.01); *F04B 47/08* (2013.01); *F04B 49/02* (2013.01); *H02G 9/12* (2013.01)

(58) Field of Classification Search
CPC .......... E21B 43/01; F04B 17/03; F04B 47/08; F04B 49/02; F04B 49/06; H02G 9/12
See application file for complete search history.

(56) References Cited

U.S. PATENT DOCUMENTS

| 4,805,118 A | 2/1989 | Rishel |
| 6,264,431 B1 | 7/2001 | Triezenberg |

(Continued)

FOREIGN PATENT DOCUMENTS

| WO | WO-2004114498 A2 | 12/2004 |
| WO | WO-2007071266 A1 | 6/2007 |

(Continued)

OTHER PUBLICATIONS

Aasen, Olav Alfred; International Search Report; PCT/NO2020/050181; dated Jun. 26, 2019; 3 pages.

*Primary Examiner* — Matthew R Buck
(74) *Attorney, Agent, or Firm* — Bradley Arant Boult Cummings LLP

(57) ABSTRACT

The invention provides a system for subsea pressure booster HV (high voltage), MV (medium voltage) and LV (low voltage) power supply and distribution. The system is distinguished in that the system consists of, essentially consists of or comprises: a supply cable without a connected variable speed drive/variable frequency drive (VSD, VFD); at least one subsea pressure booster, and; one subsea direct online switch (SDOS) for each subsea pressure booster, wherein the supply cable at a source end is coupled to an AC power source at a topside, onshore or subsea location, wherein the supply cable at a pressure booster end is coupled directly or via a distribution device to at least one subsea direct online switch, SDOS, wherein each SDOS is coupled to one subsea pressure booster. Method of operation and use of the system.

6 Claims, 1 Drawing Sheet

(51) Int. Cl.
*F04B 47/08* (2006.01)
*F04B 49/02* (2006.01)
*F04B 49/06* (2006.01)
*H02G 9/12* (2006.01)

(56) References Cited

U.S. PATENT DOCUMENTS

| | | | |
|---|---|---|---|
| 7,992,632 B2* | 8/2011 | Bornes | H05B 3/58 |
| | | | 166/61 |
| 8,251,614 B2* | 8/2012 | Karstad | E21B 33/0385 |
| | | | 405/193 |
| 9,601,925 B2* | 3/2017 | Stinessen | E21B 33/0355 |
| 9,859,805 B2* | 1/2018 | Thibaut | H02J 4/00 |
| 2008/0247880 A1 | 10/2008 | Leuthen et al. | |
| 2010/0252269 A1* | 10/2010 | Legrand | E21B 47/001 |
| | | | 340/853.2 |
| 2012/0308408 A1 | 12/2012 | Rosvold | |
| 2013/0286546 A1* | 10/2013 | Hazel | H02B 1/22 |
| | | | 361/602 |
| 2016/0072284 A1* | 3/2016 | Strømsvik | H02G 9/02 |
| | | | 307/17 |
| 2016/0333677 A1* | 11/2016 | Westberg | F04D 13/025 |
| 2017/0045055 A1 | 2/2017 | Hoefel et al. | |
| 2017/0104329 A1* | 4/2017 | Boe | H02P 27/06 |
| 2017/0141548 A1* | 5/2017 | Strømsvik | H01F 27/321 |
| 2018/0094512 A1 | 4/2018 | Sadilek et al. | |
| 2018/0375456 A1 | 12/2018 | Huh et al. | |

FOREIGN PATENT DOCUMENTS

| | | |
|---|---|---|
| WO | WO-2012034984 A2 | 3/2012 |
| WO | WO-2014040627 A1 | 3/2014 |
| WO | WO-2014170320 A1 | 10/2014 |
| WO | WO-2015197140 A1 | 12/2015 |
| WO | WO-2016198370 A1 | 12/2016 |
| WO | WO-2019209120 A1 | 10/2019 |

* cited by examiner

SYSTEM FOR SUBSEA PRESSURE BOOSTER POWER SUPPLY AND DISTRIBUTION, METHOD FOR OPERATION AND USE THEREOF

TECHNICAL FIELD

The present invention relates supply and distribution of electric power to subsea pressure boosters.

BACKGROUND ART

Pumps, multiphase pumps and compressors are embodiments of subsea pressure boosters if marinized and located subsea, such as on the seabed.

Subsea pressure boosting can be vital for the recovery and production rate of a subsea petroleum reservoir. In addition to pressure boosting and transporting petroleum fluid, the subsea pressure boosting decreases the pressure the reservoir fluid has to overcome in order to flow, thereby facilitating production.

Also, water injection and other pressure boosting subsea can be vital for development, production and continued operation of a subsea field.

The design of high-voltage subsea power supply systems depends on reliable equipment to protect and separate power consumers. All the subsea solutions currently offered include standard land-based technology put into 1 bar pressure housing. Such solutions function but represents an expensive, non-flexible and challenging solution due to housings and penetrations rated up to 36 kV and 1000 A withstanding a pressure difference of several hundred bars.

A demand exists for reliable, cost effective subsea pressure booster power supply systems. The objective of the invention is to meet the demand.

SUMMARY OF INVENTION

The invention provides a system for subsea pressure booster HV (high voltage), MV (medium voltage) and LV (low voltage) power supply and distribution. The system is distinguished in that the system consists of, essentially consists of or comprises:
- a supply cable without a connected variable speed drive/variable frequency drive (VSD, VFD);
- at least one subsea pressure booster, and;
- one subsea direct online switch (SDOS) for each subsea pressure booster,
- wherein the supply cable at a source end is coupled to an AC power source at a topside, onshore or subsea location,
- wherein the supply cable at a pressure booster end is coupled directly or via a distribution device to at least one subsea direct online switch, SDOS,
- wherein each SDOS is coupled to one subsea pressure booster.

The system of the invention is feasible for system voltage up to at least 36 kV and nominal current up to at least 400 A.

A supply cable without a connected variable speed drive/variable frequency drive (VSD, VFD), means that no VFD or VFD (the terms are synonyms) based on power electronics components, are coupled between the supply cable and the power source, between the supply cable and the subsea pressure boosters, or between segments of the supply cable. Uncertainty exists with respect to subsea VSD/VFDs, since the large number of components of a subsea VSD/VFD imply that the risk for failure can be significant, which is relevant with respect to reliability and lifetime expectancy. Significant cost is saved by eliminating any VSD/VFD, topsides, in between supply cable segments subsea, or at the subsea pressure booster end of the supply cable.

A supply cable means a cable that at least in the pressure booster end is located subsea. An example is a subsea step out cable from a vessel or platform.

A subsea direct online switch (hereinafter also termed SDOS), means a subsea switch capable of being coupled at full voltage on one side and a subsea pressure booster on the other side. The system of the invention, in a preferable embodiment, comprises one SDOS, in the form of a liquid filled and pressure compensated unit, for each subsea pressure booster, wherein the SDOS preferably is compensated to ambient pressure. In other preferable embodiments of the system of the invention, one, two or more SDOSes are arranged in a distribution device, preferably a liquid filled and preferably pressure compensated distribution device, preferably pressure compensated to ambient pressure. Transformers, distribution boxes, switches and coupling boxes are examples on distribution devices.

An SDOS capable of being coupled at full voltage, means that the voltage is at least up to 36 kV, the electric current is at least up to 400 A. The frequency can be within a broad range, from a few Hz to at least 50-60 Hz and above. The preferably liquid filled subsea direct online switch preferably with pressure compensator, can be used to start and stop the connected subsea pressure booster without any control units in the power supply chain between the power source in the source end of the supply cable and the preferably liquid filled subsea direct online switch with pressure compensator. The capability of start and stop of each individual subsea pressure booster without any control unit in the power supply chain between the power source in the source end of the supply cable and the SDOS is new and the simplification has beneficial effect with respect to cost and reliability. The pressure compensation allows to use low pressure LP or medium pressure MP, instead of high-pressure HP, feed-throughs/penetrators/couplings/jumpers. Each liquid filled subsea direct online switch with pressure compensator includes or is operatively arranged to an actuator, for operating the switch. Preferably, the liquid is oil, most preferably a transformer oil.

In a preferable embodiment of the system of the invention, one pressure compensator is arranged to pressure compensate not only one but two or three or more subsea housings.

The system of the invention preferably comprises two, three, four or more subsea pressure boosters and liquid filled subsea direct online switches with pressure compensator, coupled via a distribution device to the pressure booster end of the supply cable. Each subsea pressure booster can thereby be started and stopped individually.

Preferably, the distribution device is a subsea transformer, with one primary winding coupled to the supply cable and one secondary winding for each subsea pressure booster, with each secondary winding coupled to a liquid filled (preferably transformer oil) subsea direct online switch with pressure compensator coupled to a subsea pressure booster, with the transformer arranged in a liquid filled (preferably transformer oil) and pressure compensated housing and each liquid filled subsea direct online switch SDOS with pressure compensator arranged in a separate housing, with ROV (remotely operated vehicle) or ROT (remotely operated tool) remotely wet mate able connectors in between said housings, preferably also ROV/ROT remotely wet mate able connectors in between each SDOS and pressure booster.

In a preferable embodiment the SDOS is built in as a part of the motor housing or pressure booster housing. This minimize the number of housings and penetrators/feedthroughs/couplings/jumpers, thereby minimizing the number of sources for failure, while still allowing individual start, stop, ROV/ROT aided replacement and repair for each subsea pressure booster and SDOS.

The transformer alternatively is a split transformer with one primary winding housing and one common secondary winding housing or a separate housing for each secondary winding housing. Alternatively, the transformer and the SDOSes are arranged in a common liquid filled and pressure compensated housing, with couplings wet mate able by an ROV or ROT to the subsea pressure boosters.

The distribution device is a transformer if the supply cable voltage is different from the pump voltage. For long subsea step outs a transformer become more preferable since higher voltage in the supply cable reduces the current level and unwanted effects thereby.

For some embodiments, the preferable distribution device is a distribution box. For shorter subsea step out lengths a distribution box become more preferable.

Each SDOS comprises an actuator for opening and closing the switch. The actuator is electrical, hydraulic, mechanical or electromagnetic. The actuator is any configuration of linear, rotary and linear rotary switches. The actuator is operatively coupled to a control link, for receiving control signals, which control link is by cable, optical fiber or is a wireless control link. By receiving an on or off signal via the control link, the liquid filled subsea direct online switch with pressure compensator locks to position on or off, respectively. When set in position on, the actuator is locked in position on, with a subsea pressure booster motor on. When set in position off, the actuator is locked in position off, with the subsea pressure booster motor off and disconnected. The coupling parts actuated to couple and decouple by the actuator are designed to perform connection and disconnection of an electric circuit of the voltage and current level of the system, at least when motor and pump/compressor are started sequentially as preferred. Feasible structures are for example a knife, rod, wheel or screw coupler of sufficient dimension, preferably including an electric insulation between actuator and electric coupling parts.

Preferably, each SDOS, and preferably also the distribution device if included, is arranged in a liquid filled housing comprising a pressure balancing device for balancing the pressure inside the housing to outside ambient pressure or a controlled overpressure or underpressure, and feedthroughs/penetrators of low-pressure LP type or medium pressure MP type. The pressure balancing device can be a cylinder pressure compensator, a flexible bellow pressure compensator or oppositely directed control valves or check valves, arranged towards the ambient pressure on one side and against the fluid filled housing on the other side.

Preferably, each subsea pressure booster comprises a hydraulic variable speed drive or torque converter or clutch device, for adjusting the speed of the pressure booster from 0 or near 0 to a maximum, which maximum preferably is at least 1.6 times higher with respect to rpm than for a motor of the subsea pressure booster, preferably at least twice the motor rpm. The hydraulic variable speed drive or torque converter or clutch device is preferably arranged in a common pressure booster housing, alternatively in a separate housing between a pressure booster motor housing and a pump/compressor housing, or inside the pump/compressor housing. A clutch and gear device can be feasible for power level up to at least 1 kW, or for coupling/decoupling at power level up to at least 1 kW, with stable coupling at higher coupling levels when first coupled at lower power level. The gear can be a 1 to 1 coupling, in which case the clutch and gear device is only a clutch device, or the gear can be a step up gear. Such subsea pressure boosters are described and illustrated in the patent publication US 2016/0333677 A1, by the Applicant, and in not yet published patent application by the Applicant, PCT/NO2019/050094, both of which are incorporated herein by reference. The advantage is that each motor can be started individually in idle or near idle configuration, before coupling in the respective pump/compressor, thereby reducing the overcurrent problem. Without such capability, the power supply and distribution system must be dimensioned for higher overcurrent.

The invention also provides a method of operating a system according to the invention. The method is distinguished in that it comprises, consists essentially of or consists of the steps to connect a subsea direct online switch with pressure compensator, SDOS, in order to start the pressure booster coupled to said SDOS and to disconnect said SDOS to stop said pressure booster.

Preferably, said steps includes to send a control signal via a control link, for opening or closing said SDOS by an actuator integrated or operatively connected to said SDOS. The control link is an electric cable, a fiber or a wireless control link.

Preferably, when the system comprises two or more pressure boosters, pressure boosters are started sequentially by closing a first SDOS and when a first pressure booster motor has finished the startup current transient (motor rotates stable at for example at least 85% of operating or maximum rpm), close a second SDOS and when a second pressure booster motor has finished the startup current transient start further pressure booster motors sequentially and likewise; with the pressure booster motors rotating stable, couple in a first pressure booster pump or compressor, when the first pressure booster pump or compressor rotates stable, couple in a second pressure booster pump or compressor, and couple in further pumps or compressors sequentially and likewise.

The invention also provides use of the system according to the invention and/or the method of the invention, for boosting the pressure of a fluid subsea.

Preferably, the subsea pressure booster motors are started successively, which provides lower overcurrent than simultaneous start. Preferably, the system is so dimensioned that successive or sequential start will not trigger any overcurrent protection. Preferably, also stop of subsea pressure boosters is successive or sequential.

Preferably, the system comprises a protection device, preferably an overcurrent protection device that switch off the failing motor circuit before the other motors stops.

DETAILED DESCRIPTION OF THE INVENTION

Figure 1:
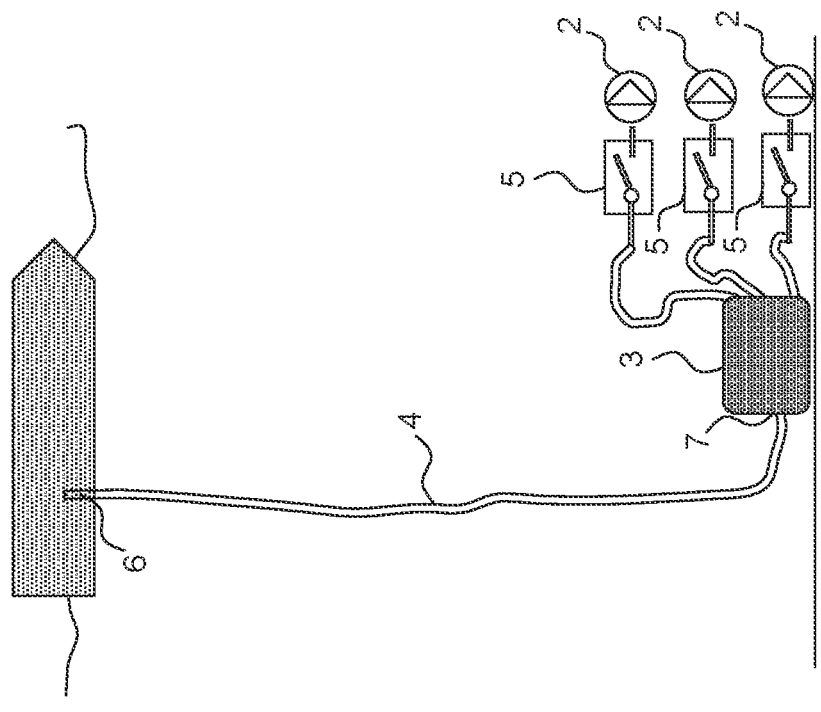
FIGS. 1 and 2 illustrate embodiments of a system of the invention.

Reference is made to FIG. 1, illustrating an embodiment of the system 1 of the invention with three subsea pressure boosters 2. A distribution device 3 in the form of a transformer or a distribution box is arranged on the seabed in a pressure booster end of the supply cable 4. One liquid filled subsea direct online switch with pressure compensator (SDOS) 5 for each subsea pressure booster is arranged, between the distribution device and each subsea pressure booster. The supply cable is extending from a source end 6, on an FPSO (floating production, storage and offloading vessel), to a pressure booster end 7 on the seabed.

The figures are illustrative for essential components only and are out of scale for improved clarity.

Figure 2:
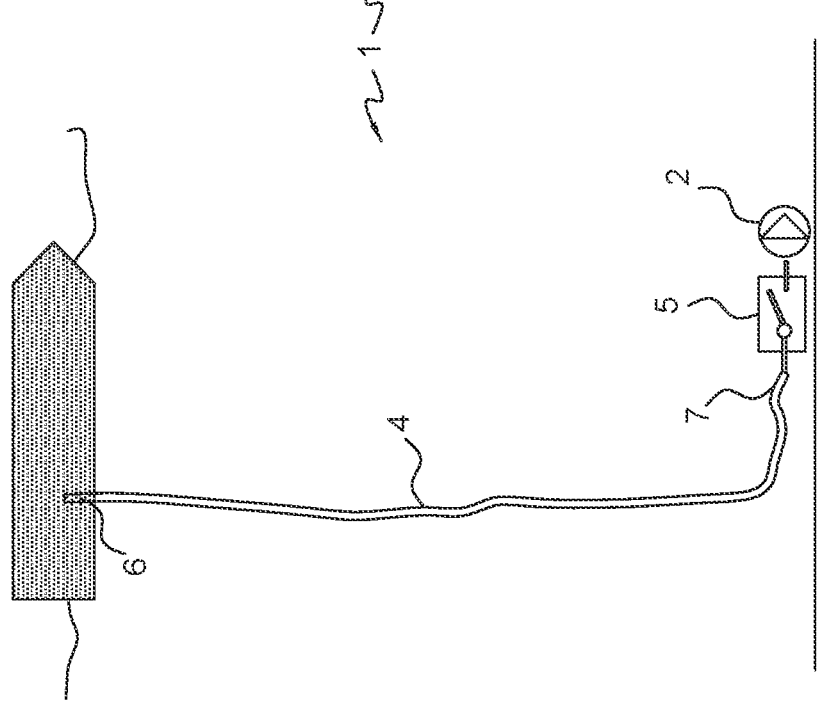

Reference is made to FIG. 2, illustrating an embodiment of the system 1 of the invention with one subsea pressure booster 2. At the subsea pressure booster end of the supply cable 4, a SDOS 5 is arranged between the supply cable and the subsea pressure booster 2.

Benefits of the system, methods and use of the invention include, but are not limited to:

- Simpler HV power supply system—no VSD required (neither topside nor subsea), including associated equipment including cooling (HVAC) and EX protection and noise filtering equipment.
- Longer step-outs—Damaging noise is normally amplified with distance when pumps are operated by VSD and connected by long subsea cables.
- No-load start of motor—In preferable embodiments the motor is hydraulically or by a clutch device decoupled from the pump or compressor of the subsea pressure booster
- Soft start—Less mechanical wear
- Full-range Variable Speed functionality, preferably embedded in the Pump Unit itself—By means of variable angle or position guide vanes or other means controlling fluid flow inside the Torque Converter
- Rapid response to changes in process conditions—Preferable torque converter holds transferred power (kW) constant at any given guide vane position and provides immediate and soft response to any transient
- Rotodynamic stability—Motor can operate at lower speeds than the pump—which gives less vibrations
- Low motor speed operation—Reduces friction losses on the motor leading to increased motor efficiency for high speed pump applications
- Reduced cost
- Improved reliability due to reduced number of components that can fail.
- Reduced overcurrent due to individual start of motor and subsequent individual start/coupling of pump/compressor.
- Avoid pressure housing/canisters rated to hundreds of bars differential pressure over the housing wall.
- Provide a simplified design nearly independent of water depth, voltage and current rating.
- Replaceable components, individually or in groups, preferably by unmanned intervention, aided only by an ROV-remotely operable vehicle, or a ROT-remotely operable tool, deployable and controlled from a vessel.
- Low pressure LP or medium pressure MP penetrators and feedthroughs.

The invention claimed is:

1. A system for subsea pressure booster power supply and distribution, wherein the system essentially consists of:
   a supply cable;
   at least one subsea pressure booster comprising a motor driving a pump or compressor;
   one subsea direct online switch (SDOS) for the at least one subsea pressure booster, wherein the SDOS comprises a linear, a rotary or a combined linear-rotary actuator coupled to a control link for opening or closing the SDOS, for stop or start of the at least one subsea pressure booster, independently from a power supply control system;
   wherein the supply cable at a source end is coupled to an AC power source at a topside, onshore or subsea location;
   wherein the supply cable at a pressure booster end is coupled directly or via a distribution device to the SDOS;
   wherein the SDOS is coupled to the motor of the at least one subsea pressure booster;
   wherein the supply cable, between the AC power source and the motor of the at least one subsea pressure booster, is without a connected variable speed drive (VSD) and without a variable frequency drive (VFD); and
   wherein the distribution device is a subsea transformer comprising one primary winding coupled to the supply cable and one secondary winding for the at least one subsea pressure booster, coupled to a liquid filled subsea direct online switch (SDOS) with a pressure compensator, coupled to the at least one subsea pressure booster, with the subsea transformer arranged in a liquid filled and pressure compensated housing and the SDOS arranged in a separate housing, with remotely wet mate able connectors in between the housings.

2. The system according to claim 1, wherein the at least one subsea pressure booster comprises a hydraulic variable speed drive or torque converter or clutch and gear device, for adjusting a speed of the pump or compressor of the at least one subsea pressure booster from 0 or near 0 to a maximum, which maximum of at least 1.6 times higher with respect to rpm than for a motor of the at least one subsea pressure booster, or at least twice the motor rpm.

3. The system according to claim 1, comprising remotely wet mate able connectors in between the SDOS and the at least one subsea pressure booster.

4. A method of operating a system according to claim 1, comprising:
   connecting the subsea direct online switch with pressure compensator (SDOS), in order to start the at least one subsea pressure booster coupled to the SDOS;
   disconnecting the SDOS to stop the at least one subsea pressure booster;
   wherein the step includes sending a control signal via a control link, for opening or closing the SDOS by an actuator integrated or operatively connected to the SDOS;
   wherein the system comprises:
      at least two pressure boosters with a hydraulic variable speed drive or torque converter or clutch and gear device coupling the motor to the pump or compressor, wherein the at least two pressure boosters are started sequentially by closing a first SDOS and when a first pressure booster motor has finished a startup current transient, close a second SDOS and when a second pressure booster motor has finished a startup current transient start further pressure booster motors sequentially and likewise; and
      with the first and second pressure booster motors rotating stable, couple in a first pressure booster pump or compressor, when the first pressure booster pump or compressor rotates stable, couple in a second pressure booster pump or compressor, and couple in further pumps or compressors sequentially and likewise.

5. A system for subsea pressure booster power supply and distribution, wherein the system essentially consists of:
- a supply cable;
- at least one subsea pressure booster comprising a motor driving a pump or compressor;
- one subsea direct online switch (SDOS) for the at least one subsea pressure booster;
- wherein the SDOS comprises a linear, a rotary or a combined linear-rotary actuator, coupled to a control link for opening or closing the SDOS, for stop or start of the at least one subsea pressure booster, independently from a power supply control system;
- wherein the supply cable at a source end is coupled to an AC power source at a topside, onshore or subsea location;
- wherein the supply cable at a pressure booster end is coupled directly or via a distribution device to the SDOS;
- wherein the SDOS is coupled to the motor of the at least one subsea pressure booster;
- wherein the supply cable, between the AC power source and the motor of the at least one subsea pressure booster, is without a connected variable speed drive (VSD) and without a variable frequency drive (VFD); and
- wherein the at least one subsea pressure booster comprises a hydraulic variable speed drive or torque converter or clutch and gear device, arranged between the motor and the pump or compressor.

6. The system of claim 5, comprising a plurality of subsea pressure boosters, each subsea pressure booster of the plurality of subsea pressure boosters is operatively coupled to a distribution device via the SDOS.

* * * * *